(12) United States Patent
Makino

(10) Patent No.: US 10,768,144 B2
(45) Date of Patent: Sep. 8, 2020

(54) SURFACE CHARACTERISTICS EVALUATION APPARATUS AND SURFACE CHARACTERISTICS EVALUATION METHOD FOR STEEL MATERIAL

(71) Applicant: SINTOKOGIO, LTD., Nagoya-shi, Aichi (JP)

(72) Inventor: Yoshiyasu Makino, Okazaki (JP)

(73) Assignee: SINTOKOGIO, LTD., Aichi (JP)

( * ) Notice: Subject to any disclaimer, the term of this patent is extended or adjusted under 35 U.S.C. 154(b) by 178 days.

(21) Appl. No.: 15/737,948

(22) PCT Filed: Jun. 7, 2016

(86) PCT No.: PCT/JP2016/066921
§ 371 (c)(1),
(2) Date: Dec. 19, 2017

(87) PCT Pub. No.: WO2016/208382
PCT Pub. Date: Dec. 29, 2016

(65) Prior Publication Data
US 2018/0188209 A1 Jul. 5, 2018

(30) Foreign Application Priority Data

Jun. 25, 2015 (JP) ................................ 2015-127821
Nov. 9, 2015 (JP) ................................ 2015-219021

(51) Int. Cl.
*G01N 27/90* (2006.01)
*C21D 11/00* (2006.01)
*C21D 7/06* (2006.01)

(52) U.S. Cl.
CPC ......... *G01N 27/9046* (2013.01); *C21D 11/00* (2013.01); *C21D 7/06* (2013.01)

(58) Field of Classification Search
None
See application file for complete search history.

(56) References Cited

U.S. PATENT DOCUMENTS 3,135,914 A 6/1964 Callan et al.
5,793,205 A 8/1998 Griffith et al.
(Continued)

FOREIGN PATENT DOCUMENTS

CN 101093205 A 12/2007
JP H05-203503 A 8/1993
(Continued)

OTHER PUBLICATIONS

Shen et al., "Conductivity profile determination by eddy current for shot-peened superalloy surfaces toward residual stress assessment", J of Applied Physics, 101, 014907 (2007), pp. 014907-1-014907-10, date published online Jan. 9, 2007.
(Continued)

*Primary Examiner* — Jermele M Hollington
(74) *Attorney, Agent, or Firm* — Brinks Gilson & Lione

(57) ABSTRACT

To provide a surface characteristics evaluation apparatus and a surface characteristics evaluation method that evaluate the residual stress in a steel material subjected to a surface modification treatment by considering the distribution thereof in the depth direction. The surface characteristics evaluation apparatus includes an oscillator, a detector, and a measuring instrument. The steel material is placed to abut against or close to a coil in the detector. The oscillator applies an alternating current to the coil, and computation is performed based on a signal indicating an electric characteristic of the coil. The residual stress in the steel material is evaluated by performing this operation while successively changing the frequency of the alternating current. The coil is configured to have a self-resonant frequency higher than the operating frequency.

6 Claims, 4 Drawing Sheets

(56) References Cited

U.S. PATENT DOCUMENTS

| | | | |
|---|---|---|---|
| 7,053,608 B2* | 5/2006 | Friend | G01C 17/30 |
| | | | 324/244 |
| 7,567,873 B2 | 7/2009 | Kojima et al. | |
| 9,638,668 B2* | 5/2017 | Makino | C21D 7/06 |
| 9,964,520 B2* | 5/2018 | Makino | G01N 27/9046 |
| 10,048,227 B2* | 8/2018 | Makino | G01N 27/9046 |
| 2008/0001609 A1 | 1/2008 | Kojima et al. | |
| 2011/0316348 A1* | 12/2011 | Kai | H02J 50/40 |
| | | | 307/104 |
| 2012/0212074 A1* | 8/2012 | Uchida | H02J 17/00 |
| | | | 307/104 |
| 2014/0084910 A1* | 3/2014 | Makino | G01B 7/105 |
| | | | 324/240 |
| 2016/0341699 A1* | 11/2016 | Makino | G01N 27/9046 |
| 2018/0299939 A1* | 10/2018 | Kiyozaki | G06F 1/324 |

FOREIGN PATENT DOCUMENTS

| | | |
|---|---|---|
| JP | H07-092140 A | 4/1995 |
| JP | H08-086773 A | 4/1996 |
| JP | 2007-040865 A | 2/2007 |
| JP | 2008-002973 A | 1/2008 |
| JP | 2011-185623 A | 9/2011 |

OTHER PUBLICATIONS

Abu-Nabah et al., "Lift-off effect in high-frequency eddy current conductivity spectroscopy", NDT&E International, vol. 40 (2007), pp. 555-565, date available online Jun. 12, 2007.

Extended European Search Report for Europe Application No. 16814153.9, dated Nov. 22, 2018, pp. 1-10.

Tai, C. et al., "Modeling the Surface Condition of Ferromagnetic Metal by the Swept-Frequency Eddy Current Method", *IEEE Transactions on Magnetics*, vol. 38, No. 1, Jan. 2002, 6 pages.

International Search Report, and English language translation thereof, in corresponding International Application No. PCT/JP2016/066921, dated Aug. 16, 2016, 5 pages.

Office Action/Search Report in Taiwan Application No. 105119296, dated Oct. 23, 2019, 9 pages.

* cited by examiner

FIG.4
(A)
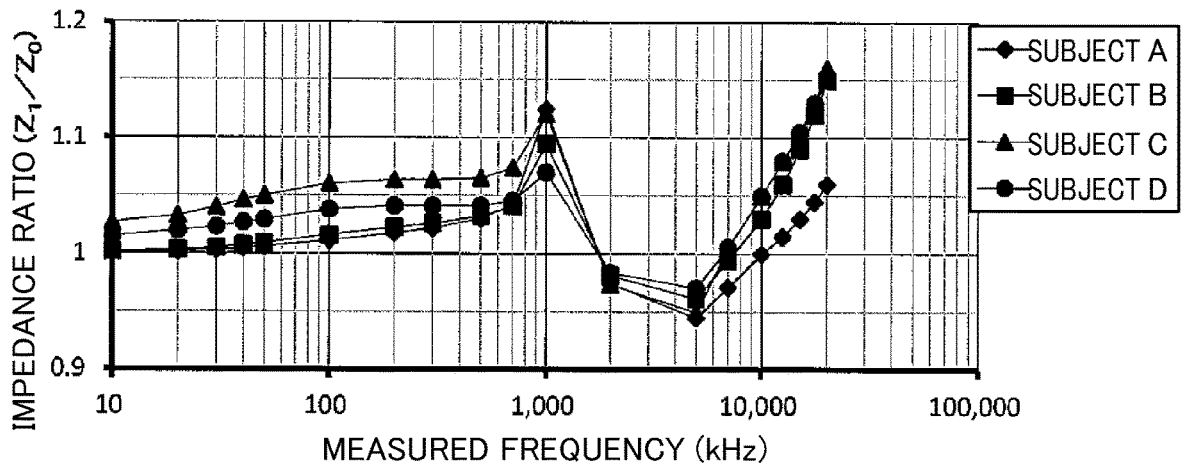
(B)
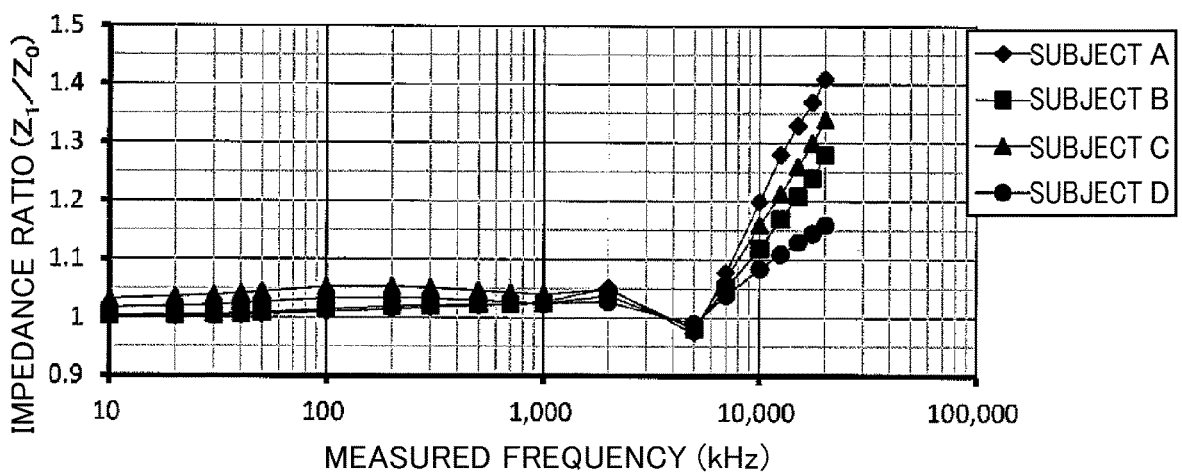
(C)
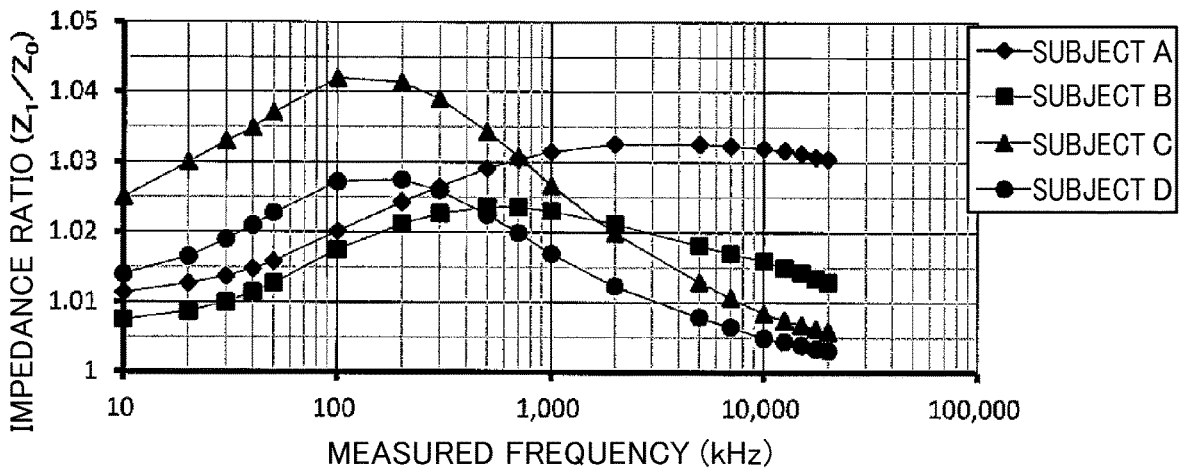

SURFACE CHARACTERISTICS EVALUATION APPARATUS AND SURFACE CHARACTERISTICS EVALUATION METHOD FOR STEEL MATERIAL

This application is a 371 application of PCT/JP2016/066921 having an international filing date of Jun. 7, 2016, which claims priority to JP2015-127821 filed Jun. 25, 2015 and JP2015-219021 filed Nov. 9, 2015, the entire contents of which are incorporated herein by reference.

TECHNICAL FIELD

The present invention relates to an apparatus that evaluates a residual stress in a steel material subjected to a surface modification treatment and a method of evaluating the degree of the surface modification treatment.

BACKGROUND ART

Widely known surface modification treatments for a steel material include various heat treatments (carburization, nitriding heat treatment and induction hardening, for example) and a shot peening treatment. The surface modification treatment imparts a residual stress in the vicinity of the surface of the steel material to improve the fatigue strength of the steel material. The conditions of the surface modification treatment are determined so as to achieve a desired residual stress depending on the use of the steel material. To precisely evaluate whether the surface modification treatment has been properly performed or not, the distribution of the residual stress in the depth direction from the surface of the steel material needs to be considered.

A method of measuring the fatigue strength of a steel material is disclosed in Patent Literature 1. In Patent Literature 1, the depth at which the compressive residual stress in a steel material subjected to shot peening as the surface modification treatment reaches the peak value is evaluated. However, according to the evaluation method disclosed in Patent Literature 1, the measurement condition needs to be set for each measurement target or each condition of the surface modification treatment is changed. Thus, due to the individual difference between the materials or other variations, the evaluation cannot be performed with high precision.

Another method of measuring the fatigue strength of a steel material is disclosed in Patent Literature 2. In Patent Literature 2, the distribution of the compressive residual stress in the steel material is calculated by successively measuring the value of the output voltage of the detecting coil while successively changing the depth of permeation (magnetic permeability) of the magnetic flux in the surface of the steel material by successively changing the frequency of the exciting current passed through the exciting coil that abuts against the steel material. However, the value of the output value of the detecting coil includes the voltage component due to the variation of the magnetic permeability and the voltage component due to the impedance of the detecting coil itself. Therefore, if the characteristics of the impedance of the detecting coil itself varies due to variations of the environment (temperature, noise or the like), the reliability of the measurement value decreases. In addition, the exciting coil of this measuring apparatus needs to be designed by considering the phenomenon (lift off effect) where the detected signal varies with the distance from the steel material. However, the disclosure contains no mention with regard to this phenomenon. Thus, the measuring apparatus disclosed in Patent Literature 2 cannot accurately evaluate the compressive residual stress in the steel material.

CITATION LIST

Patent Literature

Patent Literature 1
Japanese Patent Laid-Open No. 07-092140
Patent Literature 2
Japanese Patent Laid-Open No. 05-203503

SUMMARY OF THE INVENTION

Technical Problem

In view of the circumstances described above, the present invention provides a surface characteristics evaluation apparatus capable of precisely evaluating a residual stress in a steel material subjected to a surface modification treatment by considering the distribution of the residual stress in the depth direction, and a surface characteristics evaluation method using the surface characteristics evaluation apparatus.

Solution to the Problem

An aspect of the present invention is a surface characteristics evaluation apparatus that evaluates a distribution of a residual stress in a steel material subjected to a surface modification treatment. The surface characteristics evaluation apparatus includes an oscillator, a detector connected to the oscillator, and a measuring instrument connected to a frequency changing circuit and the detector. The oscillator includes an AC power supply and the frequency changing circuit, which is capable of changing a frequency of an alternating current output from the AC power supply. The detector can be placed to abut against or close to a subject. The detector includes a coil capable of inducing an alternating magnetic field when the alternating current is applied by the AC power supply. The measuring instrument is configured to perform a computation for each of a plurality of frequencies set by the frequency changing circuit based on a signal indicating an electric characteristic of the alternating current flowing through the coil at the plurality of frequencies. The coil has a self-resonant frequency equal to or higher than a frequency band of the alternating current set by the frequency changing circuit.

A surface characteristics evaluation method of evaluating a distribution of a residual stress in a steel material subjected to a surface modification treatment using the surface characteristics evaluation apparatus includes the following steps (1) to (5). The steps may be separately performed, or two or more of the steps may be performed at the same time.

(1) A subject placement step of placing the subject in such a manner that the alternating magnetic field permeates into the subject.

(2) An eddy current generation step of generating an eddy current in the subject. This step is achieved by activating the AC power supply and allowing the alternating magnetic field to permeate into the subject.

(3) A frequency change step of successively changing the frequency of the alternating current. This step is achieved by the frequency changing circuit while the state achieved in the step (2) described above is maintained.

(4) A detection step of detecting the signal indicating the electric characteristic of the current flowing through the coil.

This step is performed for each of the frequencies in the frequency change step (3) described above.

(5) An evaluation step of evaluating the residual stress in the subject by performing a computation based on the detected signal. This step is performed for each frequency at which detection occurs in the detection step (4) described above.

When an alternating current is applied to the coil, an alternating magnetic field is induced around the coil. When the alternating magnetic field (magnetic flux) permeates into the subject, an eddy current is generated in the subject. The eddy current induces an opposing magnetic field against the alternating magnetic field. The magnitude of the total magnetic flux of the opposing magnetic field and the alternating magnetic field varies with the magnitude of the residual stress, which indicates the degree of the surface modification treatment. That is, the signals indicating the electric characteristics of the coil through which the alternating current is flowing (the signal indicating the potential difference between the opposite ends of the coil and the signal indicating the value of the current flowing through the coil) vary with the magnitude of the residual stress. Thus, the degree of the surface modification treatment for the subject can be evaluated by evaluating the electric characteristics of the alternating current flowing through the coil. In addition, the depth of permeation of the alternating magnetic field can be changed by changing the frequency of the alternating current. Thus, by changing the frequency of the alternating current and evaluating the electric characteristics of the alternating current flowing through the coil at different frequencies, the residual stress in the subject can be evaluated by considering the distribution in the depth direction.

When the residual stress in the subject is evaluated by considering the distribution in the depth direction, the potential difference between the opposite ends of the coil and the current flowing through the coil need to be precisely detected with respect to the depth for evaluation. If the self-resonant frequency of the coil is equal to or higher than the frequency band set by the frequency changing circuit as in this aspect of the present invention, the potential difference between the opposite ends of the coil and the current flowing through the coil can be precisely detected in the range for evaluation.

According to an embodiment, the frequency band set by the frequency changing circuit may be set to fall within a range from $0.5 \times 10^3$ Hz to $20 \times 10^6$ Hz. If a heat treatment (such as carburization, nitriding heat treatment or induction hardening) or a shot peening treatment is selected as the surface modification treatment, the depth (affected layer) to which the surface of the subject is modified by the treatment generally ranges from 10 µm to 1000 µm. If the frequency band is set to fall within the range described above, the distribution of the residual stress in the vicinity of the surface of the subject can be precisely evaluated.

According to an embodiment, the coil may be formed by winding a wire formed by a plurality of conductors bundled together. With this configuration, the resonant frequency band of the coil can be further raised. In addition, the evaluation is less likely to be affected by the environment, and therefore the evaluation precision is improved.

According to an embodiment, the coil may be configured to be capable of surrounding a lateral surface of the subject. Variations in the direction perpendicular to the depth direction of the subject due to the material thereof can be reduced, and therefore the evaluation precision can be improved. In addition, the whole of the surface to be evaluated, that is, the whole of the surface subjected to the surface modification treatment can be evaluated in one measurement, so that the time required for the evaluation can be reduced.

According to an embodiment, the measuring instrument may include an I/V conversion circuit that measures the current flowing through the coil. A surface characteristics evaluation method of evaluating distribution of a residual stress in a steel material subjected to a surface modification treatment using this surface characteristics evaluation apparatus may include the following steps (1) to (5). The steps may be separately performed, or two or more of the steps may be performed at the same time.

(1) A subject placement step of placing the subject in such a manner that the alternating magnetic field permeates into the subject.

(2) An eddy current generation step of generating an eddy current in the subject. This step is achieved by activating the AC power supply and allowing the alternating magnetic field to permeate into the subject.

(3) A frequency change step of successively changing the frequency of the alternating current. This step is achieved by the frequency changing circuit while the state achieved by the frequency changing circuit in the step (2) described above is maintained.

(4) A detection step of detecting a signal indicating a potential difference between opposite ends of the coil and a signal indicating the value of the current flowing through the coil. The signal indicating the current flowing through the coil is detected by the I/V conversion circuit. The detection is performed for each of the plurality of frequencies in the frequency change step (3) described above.

(5) An evaluation step of evaluating the residual stress in the subject by performing a computation based on an impedance of the coil. The impedance is calculated based on the signal indicating the potential difference and the signal indicating the value of the current detected in the step (4). The calculation of the impedance is performed for each of the plurality of frequencies detected in the detection step (4) described above.

In this step, a signal corresponding to the impedance of the coil can be extracted for each of a plurality of depths in the subject. Thus, the impedance signal and the S/N ratio (S: evaluating voltage, N: noise that is not from the evaluating voltage) can be increased, so that the evaluation precision is improved.

According to an embodiment, the computation may be performed as follows.

(1) For the steel material yet to be subjected to the surface modification treatment (subject yet to be treated) as the subject, the signal indicating the potential difference between the opposite ends of the coil and the signal indicating the value of the current flowing through the coil are detected in advance by the measuring instrument. Based on the detection result, an impedance $Z_0$ is calculated. The calculation of the impedance $Z_0$ is performed for each frequency.

(2) For the steel material subjected to the surface modification treatment (surface-modified subject) as the subject, the signal indicating the potential difference between the opposite ends of the coil and the signal indicating the value of the current flowing through the coil are detected by the measuring instrument. Based on the detection result, an impedance $Z_1$ is calculated. The calculation of the impedance $Z_1$ is performed for each frequency.

(3) From the calculated impedances $Z_0$ and $Z_1$, the ratio thereof ($Z_1/Z_0$ or $Z_0/Z_1$) is computed.

If the ratio of the impedance for the surface-modified subject to the impedance for the subject yet to be treated is used for evaluation of the residual stress, the voltage drift due to variations of the ambient temperature and humidity can be reduced. In addition, variations of the electromagnetic characteristics caused by the surface modification treatment can be selectively extracted. Thus, the evaluation precision can be improved.

According to an embodiment, the measuring instrument may further include a phase detection circuit that measures a phase difference between the AC voltage (alternating-current voltage) applied by the AC power supply and the current flowing through the coil. A surface characteristics evaluation method of evaluating a distribution of a residual stress in a subject using this surface characteristics evaluation apparatus may include the following steps (1) to (5). The steps may be separately performed, or two or more of the steps may be performed at the same time.

(1) A subject placement step of placing the subject in such a manner that the alternating magnetic field permeates into the subject.

(2) An eddy current generation step of generating an eddy current in the subject. This step is achieved by activating the AC power supply and allowing the alternating magnetic field to permeate into the subject.

(3) A frequency change step of successively changing the frequency of the alternating current. This step is achieved by the frequency changing circuit while the state achieved in the step (2) described above is maintained.

(4) A phase difference detection step of detecting a signal indicating a potential difference between opposite ends of the coil and a signal indicating the value of the current flowing through the coil and detecting a signal indicating the phase difference between the AC voltage applied by the AC power supply and the current flowing through the coil. These detections are performed for each of the frequencies in the frequency change step (3) described above.

(5) A step of calculating an inductive reactance and evaluating the surface characteristics of the subject based on the inductive reactance. The inductive reactance is calculated based on the impedance of the coil and the phase difference calculated based on the signal indicating the potential difference and the signal indicating the value of the current detected in the step (4). The calculation of the inductive reactance and the computation are performed for each of the frequencies detected in the phase difference detection step (4) described above.

Since the inductive reactance, which is the Y-axis component of the impedance (imaginary part of the complex impedance), is calculated, and the evaluation is made based on the inductive reactance, the magnetic permeability of the subject can be selectively evaluated. As a result, the evaluation precision is improved.

According to an embodiment, the measuring instrument may output a signal to the AC power supply to successively change the frequency of the AC voltage applied by the AC power supply. The evaluation of the subject can be automatically performed.

Advantageous Effect of the Invention

According to the aspect and the embodiments, a surface characteristics evaluation apparatus and a surface characteristics evaluation method that can precisely evaluate the residual stress in a subject subjected to a surface modification treatment by considering the distribution thereof in the depth direction can be provided. Thus, the degree of the surface modification treatment performed on the steel material can be precisely evaluated by considering the distribution thereof in the depth direction.

BRIEF DESCRIPTION OF THE DRAWINGS

FIG. 4 are graphs for illustrating examples in the embodiment of the present invention.

DETAILED DESCRIPTION OF EMBODIMENTS

Figure 1:
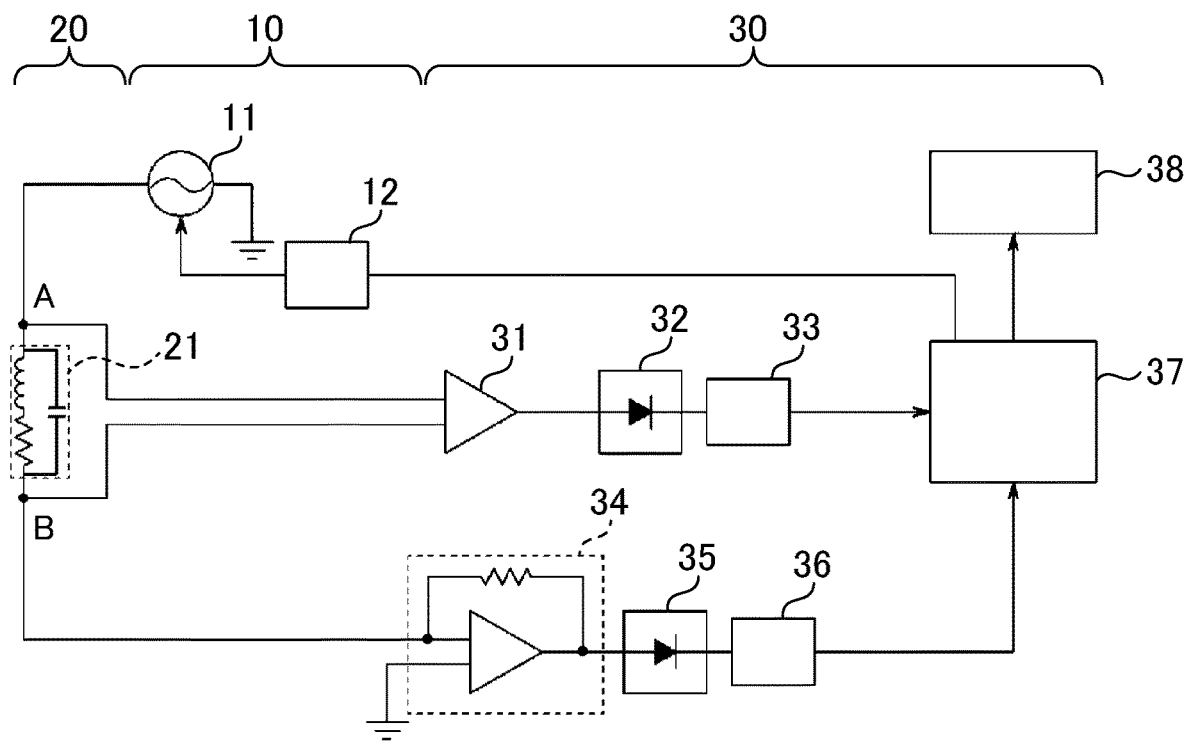
FIG. 1 is a circuit diagram for illustrating an embodiment of the present invention.

An embodiment of the present invention will be described with reference to the drawings. In the following description, the upward, downward, leftward and rightward directions indicate the respective directions in the drawings unless otherwise specified.

A surface characteristics evaluation apparatus 1 according to this embodiment includes an oscillator 10, a detector 20 and a measuring instrument 30.

The oscillator 10 includes an AC power supply 11 and a frequency changing circuit 12. The frequency changing circuit 12 is connected to the AC power supply 11 and can change the frequency of the alternating current output from the AC power supply 11.

The detector 20 includes a coil 21. The coil 21 is connected to the AC power supply 11 at one end (point A) thereof and supplied with an alternating current output from the AC power supply 11 (alternating-current power supply). The circuit diagram symbol in the dashed line box surrounding the coil 21 in FIG. 1 represents an electrically equivalent circuit of the coil 21, and the coil 21 will be described in detail later.

The measuring instrument 30 includes an amplification circuit 31, an absolute value circuit 32, a low pass filter (LPF) 33, an I/V conversion circuit 34 (current to voltage conversion circuit), an absolute value circuit 35, an LPF 36, control means 37, and a display unit 38. In addition, the measuring instrument 30 includes storage means in the control means 37 or in a section not shown. More specifically, the control means 37 may be constituted by a microprocessor, an interface circuit, a memory and a program that makes these components operate (all of which are not shown in the drawing), for example.

The amplification circuit 31 is connected to points A and B, which are opposite ends of the coil 21. A signal indicating the potential difference between the points A and B is input to the amplification circuit 31 and amplified. The amplified signal is full-wave rectified by the absolute value circuit 32, and the resulting signal is converted into a direct current by the LPF 33. The converted signal is input to the control means 37.

The I/V conversion circuit 34 is connected to the other end (point B) of the coil 21. A signal indicating the value of a current flowing through the coil 21 is input to the I/V conversion circuit 34 and converted into a signal indicating a potential difference. The signal is full-wave rectified by the absolute value circuit 35, and the resulting signal is converted into a direct current by the LPF 36. The converted signal is input to the control means 37.

The control means 37 is connected to the frequency changing circuit 12 and the LPFs 33 and 36 and receives a signal indicating the frequency of the alternating current applied to the coil 21 and the signals having passed through the LPFs 33 and 36 at the frequency. Based on these input signals, the control means 37 performs a computation and evaluates the surface characteristics of a subject based on the computation result. The frequency of the alternating current may be manually changed, or automatically changed if the control means 37 has a function of outputting a signal to successively change the frequency to the frequency changing circuit 12. This embodiment is the latter case.

The display unit 38 displays the result of the evaluation by the control means 37 or a warning about the evaluation result.

Next, the coil 21 will be described. The coil 21 is formed by a cylindrically wound conductive wire. The wire may be formed by a single conductor or a plurality of thin conductors bundled together to be formed as a single wire. In the latter case, the plurality of thin conductors may be twisted together or braided together to form the wire. Alternatively, the plurality of thin conductors may be braided together, and the braided conductors may be further twisted to form the wire. By using the plurality of thin conductors bundled together as the wire for the coil 21, the resonant frequency of the coil 21 can be raised.

The coil 21 may have a hollow cylindrical core around which the wire is wound (a cored coil). However, in this embodiment, the coil 21 has no core (an air-core coil).

The coil 21 according to this embodiment is fabricated as follows. First, a wire formed by several hundreds of enamel copper wires braided and twisted together is wound around a cylinder made of resin. The wound wire is then bonded with an epoxy resin, and the cylinder is removed to complete the coil 21.

In an alternative process of fabricating the coil 21, a wire coated with a thermosetting resin is used, for example. After the wire is wound, the wire is heated by hot air, in a drying oven or by other means and thereby fixed in the shape of the coil. Any fabrication process can be used as far as the wire can maintain the shape of the coil.

When an alternating magnetic field induced by the alternating current applied to the coil 21 permeates into the subject, an eddy current occurs in the subject. The eddy current induces an opposing magnetic field against the alternating magnetic field, so that the depth of permeation of the alternating magnetic field varies. The magnitude of the total magnetic flux of the opposing magnetic field and the alternating magnetic field varies with the magnitude of a residual stress, which indicates the degree of a surface modification treatment. Thus, the degree of the surface modification treatment can be evaluated by evaluating the electric characteristics of the current flowing through the coil 21. In order to precisely evaluate the surface characteristics of the subject, it is necessary to precisely detect the opposing magnetic field. To this end, in this embodiment, the number of windings of the wire of the coil 21 is determined so that the resonant frequency is equal to or higher than an operating frequency band. The depth (affected layer) to which the surface of the subject is modified by the surface modification treatment generally ranges from 10 μm to 1000 μm. In this case, the operating frequency band may be set to range from $0.5 \times 10^3$ Hz to $20 \times 10^6$ Hz, and the self-resonant frequency of the coil 21 may be set to be equal to or higher than 10 MHz (preferably, 1.5 or more times higher than the operating frequency band set by the frequency changing circuit 12). When a shot peening treatment is selected as the surface modification treatment, the affected layer is generally 10 μm to 300 μm thick, and thus, the operating frequency band may be set to range from $1 \times 10^3$ Hz to $20 \times 10^6$ Hz, and the resonant frequency of the coil 21 may be set to be equal to or higher than 10 MHz (preferably, 1.5 or more times higher than the operating frequency band set by the frequency changing circuit 12).

The shape of the detector 20 is not particularly limited, as far as the coil 21 can be located sufficiently close to the subject to allow the alternating magnetic field induced around the coil 21 to permeate into the subject. The detector 20 according to this embodiment has a cylindrical shape so that the subject can be inserted and placed in the central part thereof. In other words, the subject can be inserted and placed in the central part of the coil, and thus the coil 21 can surround the lateral surface of the subject. With such a configuration, the variations in the direction perpendicular to the depth direction of the subject due to the material thereof can be reduced, and therefore, the evaluation precision can be improved. In addition, the eddy current can be made to flow through the whole of the lateral surface of the subject, that is, the surface to be evaluated, and therefore, the whole of the surface to be evaluated can be evaluated in one measurement.

Next, a method of evaluating the surface characteristics of the subject using the surface characteristics evaluation apparatus 1 according to this embodiment will be described. In the following, a case will be described where the shot peening treatment (referred to as an SP treatment, hereinafter) is selected as the surface modification treatment, and a compressive residual stress in a steel material subjected to the SP treatment is evaluated as the degree of the surface modification treatment.

S01: Preparation Step

A subject that is not subjected to a surface modification treatment (a subject yet to be treated) is prepared. In this embodiment, a piece of chromium molybdenum steel (SCM420H defined in JIS G4053) having a diameter of 40 mm and a length of 30 mm carburized is prepared.

S02: Measurement Step (for the Subject Yet to be Treated)

In a first subject placement step, the subject yet to be treated is placed in the detector 20. In this embodiment, the subject yet to be treated is placed inside the coil 21 at the center of the circular cross section of the coil 21 in such a manner that the whole of the subject yet to be treated is inside the coil 21.

Figure 2:
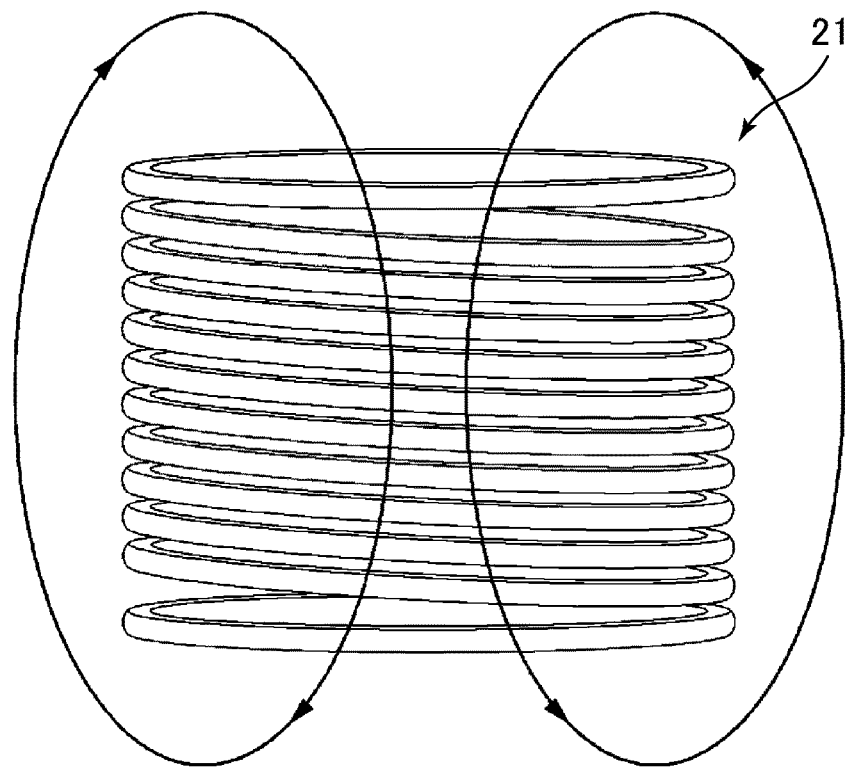
FIG. 2 is a schematic diagram for illustrating an alternating magnetic field (magnetic flux) induced around a coil in the embodiment of the present invention.

Then, in a first eddy current generation step, the control means 37 outputs a signal to control the frequency of the alternating current output from the AC power supply 11 to the frequency changing circuit 12, and the AC power supply 11 is activated. Upon activation of the AC power supply 11, an alternating magnetic field is induced around the coil 21 (see FIG. 2). Since the subject yet to be treated is placed inside the coil 21, the alternating magnetic field permeates into the subject yet to be treated. The permeating alternating magnetic field causes an eddy current in the surface of the subject, so that signals indicating the electric characteristics of the coil through which the alternating current is flowing (the signal indicating the potential difference across the coil (between the points A and B) and the signal indicating the value of the current having passed through the coil) vary. From these signals, the control means 37 calculates an impedance $Z_0$ at the frequency.

The depth to which the alternating magnetic field permeates into the subject yet to be treated depends on the frequency of the alternating current. In view of this, in a first frequency change step, the control means 37 changes the frequency of the alternating current output from the AC power supply 11. In a first detection step, while changing the frequency of the alternating current, the signals indicating the electrical characteristics of the alternating current at different frequencies are detected, and the impedance $Z_0$ of the coil 21 is computed from these signals and stored in the storage means.

S03: Surface Modification Treatment Step

The subject yet to be treated is removed from the detector 20, and then the surface modification treatment is performed on the subject.

S04: Measurement Step (for the Surface-Modified Subject)

In a second subject placement step, the piece of steel material (surface-modified subject) obtained by performing the surface modification treatment on the subject yet to be treated is placed in the detector 20, and a second eddy current generation step, a second frequency change step and a second detection step similar to the first eddy current generation step, the first frequency change step and the first detection step performed in the step S02, respectively, are performed. An impedance $Z_1$ of the coil 21 at different frequencies for the surface-modified subject is computed. The frequencies used in the second frequency change step are the same as those used in the step S02.

S05: Determination Step (Evaluation Step)

The control means 37 computes the ratio ($Z_1/Z_0$) of the impedance $Z_1$ (for the surface-modified subject) computed in the step S04 to the impedance $Z_0$ (for the subject yet to be treated) computed in the step S02 for each of the different frequencies. By using the impedance ratio for evaluation of the surface characteristics, the voltage drift due to variations of the measurement environment (temperature, humidity or the like) can be reduced. In addition, since variations of the electromagnetic characteristics of the subject caused by the surface modification treatment can be selectively extracted, the precision of the evaluation of the surface characteristics is improved.

In addition, since the frequency corresponds to the depth from the surface of the subject, this computation also provides a distribution of the degree of the surface modification treatment (compressive residual stress) in the depth direction from the surface of the subject.

The control means 37 compares this distribution with a threshold stored in advance in the storage means to determine the quality of the surface modification treatment.

S06: Output Step

The result of the determination of quality of the surface modification treatment is output on the display unit 38. The display unit 38 may simply display the determination result or may additionally give an alarm when it is determined that the quality of the surface modification treatment is bad. Alternatively, the display unit 38 may display a graph showing impedance ratio on the vertical axis and frequency (or depth from the surface of the subject) on the horizontal axis. In the latter case, the depth from the surface of the subject can also be calculated. The relationship between the frequency and the depth from the surface of the steel material can be calculated from a calibration curve showing a relationship between the frequency and the depth from the surface of the steel material, which is created according to the following formula 1. In the formula 1, the correction coefficient k is a value that varies with the shape of the subject, (the volume of the subject, for example), the properties of the subject (whether or not a heat treatment has been performed on the subject in advance, for example), or the conditions of the SP treatment (the diameter or hardness of the particles shot or the injection duration or injection pressure of the particles, for example), for example. The correction coefficient k is experimentally calculated in advance.

$$y = \kappa \frac{1}{\sqrt{\pi \chi \mu \sigma}} \quad \text{[formula 1]}$$

y: depth of permeation of alternating magnetic field (μm)
k: correction coefficient
x: frequency of alternating current (Hz)
μ: magnetic permeability of steel material (H/m)
σ: electric conductivity of steel material (S/m)

By the steps described above, the degree of the surface modification treatment can be evaluated by considering the distribution thereof in the depth direction from the surface of the subject.

When a plurality of pieces of the steel material are evaluated, the impedance $Z_0$ of the subject yet to be treated calculated in the first measurement (the first subject placement step, the first eddy current generation step, the first frequency change step and the first detection step performed in the Step S02) can be used for the second and later measurements. That is, in the second and later measurements, only the steps S04 to S06 have to be performed for the pieces of the steel material subjected to the SP treatment.

In the following, a result of evaluation of the surface characteristics of a steel material using the surface characteristics evaluation apparatus 1 according to this embodiment will be described.

The SP treatment was performed on the piece of chromium molybdenum steel (having a diameter of 40 mm and a length of 30 mm) carburized described above under the conditions that particles having average diameters ranging from 50 μm to 1000 μm (all available from SINTOKOGIO, LTD) were shot by a shot peening machine (available from SINTOKOGIO, LTD) at an injection pressure of 0.3 MPa over a coverage of 300% (see Table 1). The pieces of chromium molybdenum steel subjected to the SP treatment were used as subjects.

TABLE 1

|  | Diameter of particles shot (μm) | Injection pressure (MPa) | Coverage (%) |
| --- | --- | --- | --- |
| Subject A | 50 | 0.3 | 300 |
| Subject B | 300 | 0.3 | 300 |
| Subject C | 600 | 0.3 | 300 |
| Subject D | 1000 | 0.3 | 300 |

Three coils 21 having self-resonant frequencies of 900 kHz, 2.2 MHz and 30 MHz were used.

The frequency (operating frequency) of the alternating current was set to range from 10 kHz to 20 MHz.

The result is shown in FIG. 4. As can be seen, in the cases where the self-resonant frequency of the coil 21 is 900 kHz and is lower than the operating frequency shown in FIG. 4(A) and where the self-resonant frequency is 2.2 MHz and is lower than the operating frequency shown in FIG. 4(B), the curve of the distribution of the impedance ratio with respect to the frequency is discontinuous for all the subjects A to D. At the point of discontinuity, components corresponding to an inductor component and a conductor component of the electrical equivalent circuit of the coil 21 were detected.

On the other hand, it can be seen that, in the case where the self-resonant frequency of the coil 21 is 30 MHz and is equal to or higher than the operating frequency shown in FIG. 4(C), the curve of the distribution of the impedance ratio with respect to the frequency is continuous for all the subjects A to D.

Thus, it can be concluded that, when the self-resonant frequency of the coil 21 is equal to or higher than the operating frequency, the degree of the surface modification treatment of the subject can be better evaluated.

Modified Embodiment 1

Figure 5:
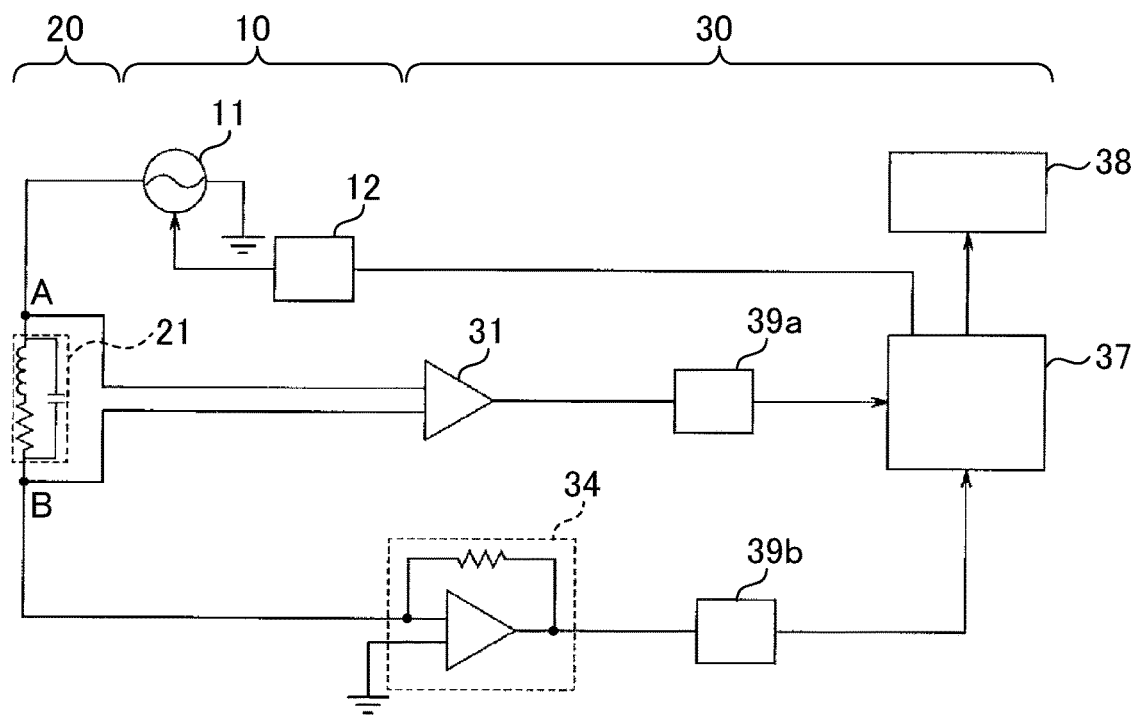
FIG. 5 is a circuit diagram for illustrating another embodiment (modification 1) of the present invention.

FIG. 5 shows a surface characteristics evaluation apparatus 2 according to another embodiment. A measuring instrument 30 of the surface characteristics evaluation apparatus 2 according to this embodiment includes the amplification circuit 31, an A/D conversion circuit 39a, the I/V conversion circuit 34, an A/D conversion circuit 39b, the control means 37, and the display unit 38. In addition, the control means 37 incorporates storage means 37a. The storage means 37a may be provided outside the control means 37. The oscillator 10 and the detector 20 are configured in the same way as those in the embodiment described earlier, so that descriptions thereof will be omitted, and the following description will be focused on the differences from the embodiment described earlier.

The amplification circuit 31 is connected to the points A and B, which are opposite ends of the coil 21. The signal indicating the potential difference between the points A and B is input to the amplification circuit 31 and amplified. The amplified signal is converted from an analog voltage signal into a digital signal by the A/D conversion circuit 39a. The converted digital signal is input to the control means 37.

The I/V conversion circuit 34 is connected to one end (point B) of the coil 21. The signal indicating the value of the current flowing through the coil 21 is input to the I/V conversion circuit 34 and converted into an analog voltage signal. The analog voltage signal output from the I/V conversion circuit 34 is converted into a digital signal by the A/D conversion circuit 39b, and the resulting signal is input to the control means 37.

The control means 37 processes the digital signals respectively received from the A/D conversion circuits 39a and 39b by a digital signal processing. More specifically, each of the digital signals received from the amplification circuit 31 and the I/V conversion circuit 34 is a time-series signal that alternatively varies, and is converted into a direct current-like digital signal by a digital computation equivalent to the absolute value circuit 32, 35 and the LPF 33, 36 (see FIG. 1) in the embodiment described earlier. Thus, the alternating-current signal of analog voltage input to each of the A/D conversion circuits 39a and 39b is converted in the control means 37 into a digital value proportional to the amplitude of the alternating-current signal. The impedance is calculated based on these digital values.

The surface characteristics evaluation apparatus 2 according to this embodiment uses a digital signal processing for signal computation and therefore is less susceptible to noise. Thus, even in an environment where noise is likely to occur, the evaluation can be made with higher precision.

Modified Embodiment 2

Figure 6:
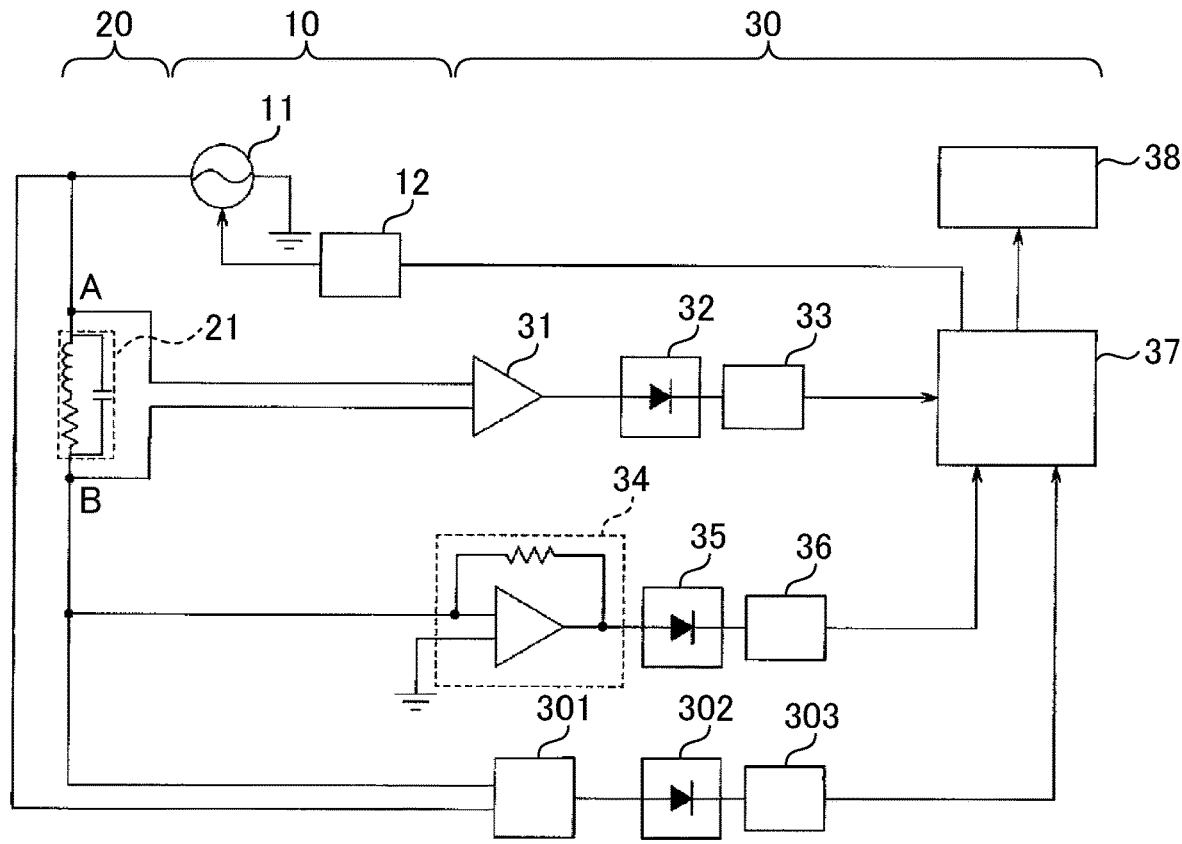
FIG. 6 is a circuit diagram for illustrating another embodiment (modification 2) of the present invention.

FIG. 6 shows a surface characteristics evaluation apparatus 3 according to another embodiment. The surface characteristics evaluation apparatus 3 according to this embodiment differs from the surface characteristics evaluation apparatus 1 (see FIG. 1) according to the embodiment described first in that the measuring instrument 30 additionally includes a phase detection circuit 301, an absolute value circuit 302 and an LPF 303. The oscillator 10 and the detector 20 are configured in the same way as those in the embodiment described first, so that descriptions thereof will be omitted, and the following description will be focused on the additional components of the measuring instrument 30.

The phase detection circuit 301 is connected to the AC power supply 11 and one end (point B) of the coil 21. A signal indicating the phase difference between the current flowing through the coil 21 and the voltage applied by the AC power supply 11 is output from the phase detection circuit 301, full-wave rectified by the absolute value circuit 302, and then converted into a direct-current signal by the LPF 303. The converted signal is input to the control means 37. That is, a voltage signal proportional to the phase difference between the voltage applied to the coil 21 and the current having passed through the coil 21 is input to the control means 37.

Figure 3:
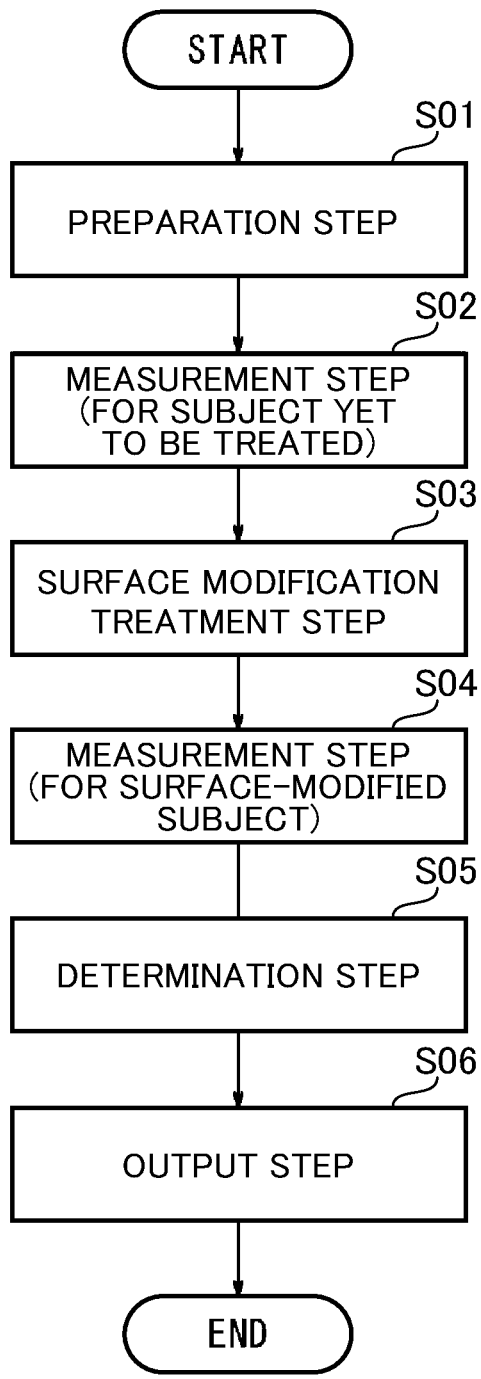
FIG. 3 is a flowchart for illustrating a surface characteristics evaluation method according to the embodiment of the present invention.

In the measurement step S02 (see FIG. 3), the control means 37 calculates the impedance $Z_0$ for the subject yet to be treated. In addition, from the signal received from the LPF 303, the control means 37 calculates a phase difference $\alpha_0$ for the subject yet to be treated. From the calculated impedance $Z_0$ and phase difference $\alpha_0$, the control means 37 calculates an inductive reactance $X_0$ for different frequencies according to a formula $X_0 = Z_0 \times \sin \alpha_0$. In addition, in the measurement step S04 (see FIG. 3), the control means 37 calculates the impedance $Z_1$ and a phase difference $\alpha_1$ for the surface-modified subject in the same manner as described above, and calculates an inductive reactance $X_1$ for the different frequencies.

In the determination step S05 (see FIG. 3), the control means 37 computes the ratio $(X_1/X_0)$ of the inductive reactance $X_1$ (for the surface-modified subject) to the inductive reactance $X_0$ (for the subject yet to be treated) described above for the different frequencies. By using the inductive reactance ratio for evaluation of the surface characteristics, the magnetic permeability of the subject can be selectively evaluated. Although the inductive reactance assumes a smaller value than the impedance does, the inductive reactance is superior to the impedance in sensitivity to a variation of the electric characteristics. When highly precise evaluation is needed, in particular, evaluation can be made with high precision by using the inductive reactance ratio.

The inductive reactance may be calculated by an analog signal processing as in this embodiment, or may be calculated by a digital signal processing by the control means 37 in the circuit shown in FIG. 5. In the latter case, a digital computation equivalent to the phase detection circuit 301, the absolute value circuit 302 and the LPF 303 in the circuit shown in FIG. 6 is performed in the control means 37, and the inductive reactance $(X_0, X_1)$ is computed based on the determined phase difference $(\alpha_0, \alpha_1)$. More specifically, the control means 37 performs the following computations a) to c).

a) The control means 37 calculates the phase difference $(\alpha_0, \alpha_1)$ between the digital signal A/D-converted from the voltage between the opposite ends of the coil by the A/D conversion circuit 39a and the digital signal A/D-converted from the current flowing through the coil by the A/D conversion circuit 39b.

b) The control means 37 calculates the impedance $(Z_0, Z_1)$ from the digital signal received via the A/D conversion circuit 39*a*, 39*b* according to the computation described above with reference to FIG. 5.

c) The control means 37 calculates the inductive reactance ($X_0$, $X_1$) by using the phase differences and impedances calculated in the calculations a) and b) described above.

INDUSTRIAL APPLICABILITY

In the embodiment described first, evaluation of the compressive residual stress imparted to a carburized steel material subjected to the SP treatment has been described. However, the surface characteristics evaluation apparatus and the surface characteristics evaluation method according to the present invention can also be applied to evaluation of a steel material subjected to various heat treatments as the surface modification treatment. Furthermore, the surface characteristics evaluation apparatus and the surface characteristics evaluation method according to the present invention can also be applied to evaluation of a steel material subjected to only the SP treatment.

What is claimed is:

1. A surface characteristics evaluation apparatus that evaluates a residual stress in a subject made of a steel material subjected to a surface modification treatment, comprising:
    an oscillator including an AC power supply and a frequency changing circuit capable of changing a frequency of an alternating current output from the AC power supply;
    a detector connected to the oscillator and placed to abut against or close to the subject so that an eddy current occurs in the subject, the detector including a coil capable of inducing an alternating magnetic field when the alternating current is applied by the AC power supply; and
    a measuring instrument connected to the frequency changing circuit and the detector;
    wherein the measuring instrument is configured to evaluate the subject by performing a computation based on signals acquired with respect to each of a plurality of frequencies set by the frequency changing circuit, and the signals indicate an electric characteristic of the alternating current flowing through the coil,
    wherein the plurality of frequencies set by the frequency changing circuit are lower than a predetermined frequency,
    wherein the coil is configured to have a self-resonant frequency equal to or higher than the predetermined frequency, and
    wherein the frequency band of the alternating current set by the frequency changing circuit falls within a range from $0.5 \times 10^3$ Hz to $20 \times 10^6$ Hz.

2. The surface characteristics evaluation apparatus according to claim 1, wherein the coil is formed by winding a wire formed by a plurality of electric conductors bundled together.

3. The surface characteristics evaluation apparatus according to claim 1, wherein the coil is configured to be capable of surrounding a lateral surface of the subject.

4. The surface characteristics evaluation apparatus according to claim 1, wherein the measuring instrument includes an I/V conversion circuit that measures the current flowing through the coil.

5. The surface characteristics evaluation apparatus according to claim 4, wherein the measuring instrument further includes a phase detection circuit that measures a phase difference between an AC voltage applied by the AC power supply and the current flowing through the coil.

6. The surface characteristics evaluation apparatus according to claim 1, wherein the frequency changing circuit outputs a signal to the AC power supply so that the frequency of the AC voltage applied by the AC power supply is continuously changed.

* * * * *